(12) United States Patent
Pothier

(10) Patent No.: US 10,303,254 B2
(45) Date of Patent: May 28, 2019

(54) DEVICE AND METHOD FOR IDENTIFYING TAP OR WIPE HAND GESTURES USING TIME-OF-FLIGHT SENSING

(71) Applicant: STMICROELECTRONICS SA, Montrouge (FR)

(72) Inventor: Olivier Pothier, Sceaux (FR)

(73) Assignee: STMicroelectronics SA, Montrouge (FR)

( * ) Notice: Subject to any disclaimer, the term of this patent is extended or adjusted under 35 U.S.C. 154(b) by 165 days.

(21) Appl. No.: 14/863,585

(22) Filed: Sep. 24, 2015

(65) Prior Publication Data

US 2017/0090581 A1 Mar. 30, 2017

(51) Int. Cl.
  *G06F 3/01* (2006.01)
  *G06F 3/03* (2006.01)

(52) U.S. Cl.
  CPC ............ *G06F 3/017* (2013.01); *G06F 3/0304* (2013.01)

(58) Field of Classification Search
  CPC ...... G06F 3/0325; G06F 3/042–3/0428; G06F 2203/04101
  See application file for complete search history.

(56) References Cited

U.S. PATENT DOCUMENTS

| | | | |
|---|---|---|---|
| 8,610,043 B2 | 12/2013 | Baxter | |
| 2008/0065291 A1 | 3/2008 | Breed | |
| 2009/0262089 A1* | 10/2009 | Wang | G06F 3/04883 345/173 |
| 2014/0124652 A1 | 5/2014 | Dutton et al. | |
| 2015/0032258 A1 | 1/2015 | Passot et al. | |
| 2015/0084884 A1 | 3/2015 | Cherradi El Fadili | |
| 2015/0116273 A1* | 4/2015 | Gao | G06F 3/0421 345/175 |
| 2015/0144767 A1 | 5/2015 | Drader et al. | |
| 2015/0145768 A1 | 5/2015 | Drader et al. | |
| 2015/0177369 A1* | 6/2015 | Kostamovaara | G01S 17/107 356/5.08 |
| 2016/0004908 A1* | 1/2016 | Lundberg | G06K 9/48 382/103 |
| 2016/0061693 A1* | 3/2016 | Salsbury | F24F 11/006 702/182 |

OTHER PUBLICATIONS

Simpson et al., "Bayesian Combination of Multiple, Imperfect Classifiers," NIPS 2011, Dec. 2011 (Spain), 8 pages.
(Continued)

*Primary Examiner* — William Boddie
*Assistant Examiner* — Jeffrey Parker
(74) *Attorney, Agent, or Firm* — Slater Matsil, LLP

(57) ABSTRACT

An electronic device includes a laser source configured to direct laser radiation toward a user's hand. A laser detector is configured to receive reflected laser radiation from the user's hand. A controller is coupled to the laser source and laser detector and configured to determine a plurality of distance values to the user's hand based upon a time-of-flight of the laser radiation, calculate a mean absolute deviation (MAD) value based upon the plurality of distance values, and identify whether the user's hand is moving in a first or second gesture based upon the MAD value.

25 Claims, 19 Drawing Sheets

(56) References Cited

OTHER PUBLICATIONS

Sayer, "STMicro Could Enable Touchless Gesture Control of Smartphones," IDG News Services, Feb. 27, 2014, Downloaded from Internet on Sep. 8, 2015, http://www.computerworld.com/article/2488087/mobile-wireless/stmicro-could-enable-touch . . . ; 4 pages.

Gillian, "Gesture Recognition Toolkit," http://www.nickgillian.com/software/grt, downloaded from Internet on Sep. 11, 2015, pp. 1-4.

"Infrared Gesture Sensing," Silicon Laboratories, Inc., Austin, TX, AN580, Rev. 0.1, Feb. 2011, pp. 1-10.

Wu et al., "Detection and Tracking of Multiple, Partially Occluded Humans by Bayesian Combination of Edgelet Based Part Detectors," International Journal of Computer Vision, Dec. 13, 2006, copyright 2007 Springer Science + Business Media, LLC; 20 pages.

Monteith et al., "Turning Bayesian Model Averaging Into Bayesian Model Combination," The 2011 International Joint Conference on Neural Networks (IJCNN); Jul.-Aug. 2011; 7 pages.

\* cited by examiner

| GESTURE | NAME | DESCRIPTION |
|---|---|---|
|  | 00-SINGLE TAP | Z-AXIS MOVEMENT FROM ABOVE, DOWN TO THE SENSORS, THEN UP |
|  | 01-DOUBLE TAP | Z-AXIS MOVEMENT FROM ABOVE, DOWN TO THE SENSORS, THEN UP, DOWN AGAIN AND FINALLY UP |
|  | 02-PAGEFLIP-LtR | X-AXIS MOVEMENT, FROM LEFT TO RIGHT, HAND MIMICKING A PAGE FLIP |
|  | 03-PAGEFLIP-RtL | X-AXIS MOVEMENT, FROM RIGHT TO LEFT, HAND MIMICKING A PAGE FLIP |
| 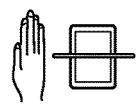 | 04-SINGLEWIPE-LtR | X-AXIS MOVEMENT, FROM LEFT TO RIGHT HAND IN NATURAL FLAT POSITION |
| 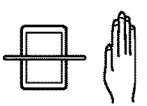 | 05-SINGLEWIPE-RtL | X-AXIS MOVEMENT, FROM RIGHT TO LEFT HAND IN NATURAL FLAT POSITION |
| 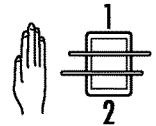 | 06-DOUBLEWIPE-LtRtL | X-AXIS MOVEMENT, FROM LEFT TO RIGHT THEN BACK TO LEFT HAND IN NATURAL FLAT POSITION |
| 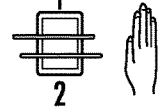 | 07-DOUBLEWIPE-RtLtR | X-AXIS MOVEMENT, FROM RIGHT TO LEFT THEN BACK TO RIGHT HAND IN NATURAL FLAT POSITION |

FIG. 3A

| GESTURE | NAME | DESCRIPTION |
|---|---|---|
| 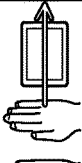 | 08-SINGLEWIPE-BtT | Y-AXIS MOVEMENT, FROM BOTTOM TO TOP (FRONT TO REAR) HAND IN NATURAL FLAT POSITION |
| 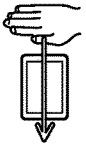 | 09-SINGLEWIPE-TtB | Y-AXIS MOVEMENT, FROM TOP TO BOTTOM (REAR TO FRONT) HAND IN NATURAL FLAT POSITION |
| 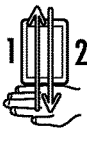 | 10-DOUBLEWIPE-BtTtB | Y-AXIS MOVEMENT, FROM BOTTOM TO TOP THEN BACK TO BOTTOM HAND IN NATURAL FLAT POSITION |
|  | 11-DOUBLEWIPE-TtBtT | Y-AXIS MOVEMENT, FROM TOP TO BOTTOM THEN BACK TO TOP HAND IN NATURAL FLAT POSITION |
|  | 12-ROTATION-CLOCKWISE | XY-PLANE MOVEMENT FROM RIGHT TO LEFT WITH A FLAT CIRCULAR MOVEMENT |
| 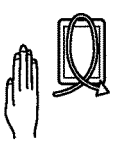 | 13-ROTATION-ANTICLOCKWISE | XY-PLANE MOVEMENT FROM LEFT TO RIGHT WITH A FLAT CIRCULAR MOVEMENT |

FIG. 3B

|  | LtR WIPE | RtL WIPE | BtT WIPE | TtB WIPE | SINGLE TAP |
|---|---|---|---|---|---|
|  | MAD | MAD | MAD | MAD | MAD |
| LEFT | 0.67 | 0.68 | 0.50 | 0.69 | 2.26 |
| TOP | 0.59 | 0.54 | 0.54 | 0.62 | 2.27 |
| BOTTOM | 0.70 | 0.60 | 0.64 | 0.76 | 3.16 |
| RIGHT | 0.61 | 0.59 | 0.66 | 0.68 | 2.17 |

TRIGGERED TIME DIFFERENCE DETECTOR
STATISTICAL DISCRIMINATION: AVERAGE VALUES (IN MS)

| | HORIZONTAL DIFFERENCE | | | VERTICAL DIFFERENCE | | |
|---|---|---|---|---|---|---|
| | ΔH_START | ΔH_END | ΔH_MIDDLE | ΔV_START | ΔV_END | ΔV_MIDDLE |
| ST | 4.49 | 13 | 8.75 | 36.65 | -41.92 | -2.63 |
| SW LtR | 61.85 | 56.41 | 59.13 | 9.72 | -30.84 | -10.56 |
| SW RtL | -58.38 | -61.33 | -58.35 | 28.14 | -6.01 | 11.06 |
| SW BtT | 5.15 | 32.36 | 18.75 | 46.97 | 45.46 | 46.21 |
| SW TtB | -33 | -5 | -19.25 | -48 | -47 | -48.08 |

FIG. 14

|        | ST     | SW     |
|--------|--------|--------|
| ST     | 97.62% | 2.38%  |
| SW LtR | 1.44%  | 98.56% |
| SW RtL | 1%     | 99%    |
| SW BtT | 0.5%   | 99.5%  |
| SW TtB | 1%     | 99%    |

FIG. 15

DEVICE AND METHOD FOR IDENTIFYING TAP OR WIPE HAND GESTURES USING TIME-OF-FLIGHT SENSING

TECHNICAL FIELD

The present disclosure relates to devices that determine hand gestures, and more particularly, to electronic devices that determine hand gestures using laser sources and laser detectors.

BACKGROUND

Mobile wireless communications devices, tablets, and similar devices have touch screens that often are equipped with proximity detectors, such as infrared sensors, that detect simple gestures. For example, the devices may detect the approach or movement of an object, such as a finger or mechanical stylus. This detection may be used to disable a touch screen function for the mobile wireless communications device during a call when the device is near the ear of a user. Infrared sensors may use the brightness reflected by the target object to determine a rough estimate of the distance to the moving object.

Other more complicated gesture recognition systems interpret simple hand gestures to enable touchless gesture control of wireless communications devices, tablets and similar devices. The device may respond to simple, touchless commands, distinguishing between more complicated simple hand gestures. These systems allow intuitive ways for users to interact with their electronic devices. For example, a hand gesture, such as a hand wipe, may instruct the device to implement a page turn for a book application on a tablet. These current hand gesture recognition systems, however, involve intensive processing of data using complicated algorithms, often including time-of-flight and machine learning and based algorithms that require extensive computations to discriminate between even the most common hand gestures, such as a single tap or single wipe. More efficient hand gesture recognition systems are desired to facilitate their use with smaller and more compact electronic devices, such as cell phones and tablets but also consumer electronic devices, such as light dimmers and water faucets, without using excessive processing resources and memory.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device comprises a laser source configured to direct laser radiation toward a user's hand. At least one laser detector is configured to receive reflected laser radiation from the user's hand. A controller is coupled to the laser source and at least one laser detector and configured to determine a plurality of distance values to the user's hand based upon a time-of-flight of the laser radiation, calculate a mean absolute deviation (MAD) value based upon the plurality of distance values, and identify whether the user's hand is moving in a first or second gesture based upon the MAD value.

The first and second gesture may comprise a tap and wipe, respectively. A MAD value being above a threshold may indicate the tap and a MAD value under the threshold may indicate the wipe. The at least one laser detector may comprise a plurality of laser detectors. The controller may be configured to calculate the MAD value for each plurality of distance values for each laser detector and determine an average MAD value used to identify whether the user's hand is moving in the first or second gesture.

The at least one laser detector may comprise a single photon avalanche diode (SPAD) detector configured to receive reflected laser radiation. The SPAD detector may comprise an array of single photon avalanche diodes. The laser source, SPAD detector, and controller may be formed as a single integrated circuit (IC). The laser source may comprise a vertical-cavity surface-emitting laser (VCSEL). The laser source may comprise an infrared (IR) laser source.

A method of determining a hand gesture comprises directing laser radiation from at least one laser source toward a user's hand and receiving within at least one laser detector the reflected laser radiation from the user's hand. The method further comprises using a controller coupled to the laser source and the at least one laser detector to determine a plurality of distance values to the user's hand based upon a time-of-flight of the laser radiation, calculate a mean absolute deviation (MAD) value based upon the plurality of distance values, and identify whether the user's hand is moving in a first or second gesture based upon the MAD value.

BRIEF DESCRIPTION OF THE DRAWINGS

Other objects, features and advantages will become apparent from the detailed description of which follows, when considered in light of the accompanying drawings in which:

FIGS. 3A and 3B are tables showing different hand gestures that can be determined from the electronic device in accordance with a non-limiting example.

FIG. 14 is a table showing a statistical discrimination with triggered time differences in accordance with a non-limiting example.

FIG. 15 is a table showing examples of the scoring probability (aka confusion matrix) with the single tap and single wipe in accordance with a non-limiting example.

DETAILED DESCRIPTION

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

The electronic device as disclosed may operate as a sensor device and permits hand gesture recognition using time-of-flight detection of sensor signals in low cost, low power devices, such as a mobile wireless communications device or consumer electronic devices, such as light dimmers and water faucets, while using less processing power and memory footprint.

Figure 1:
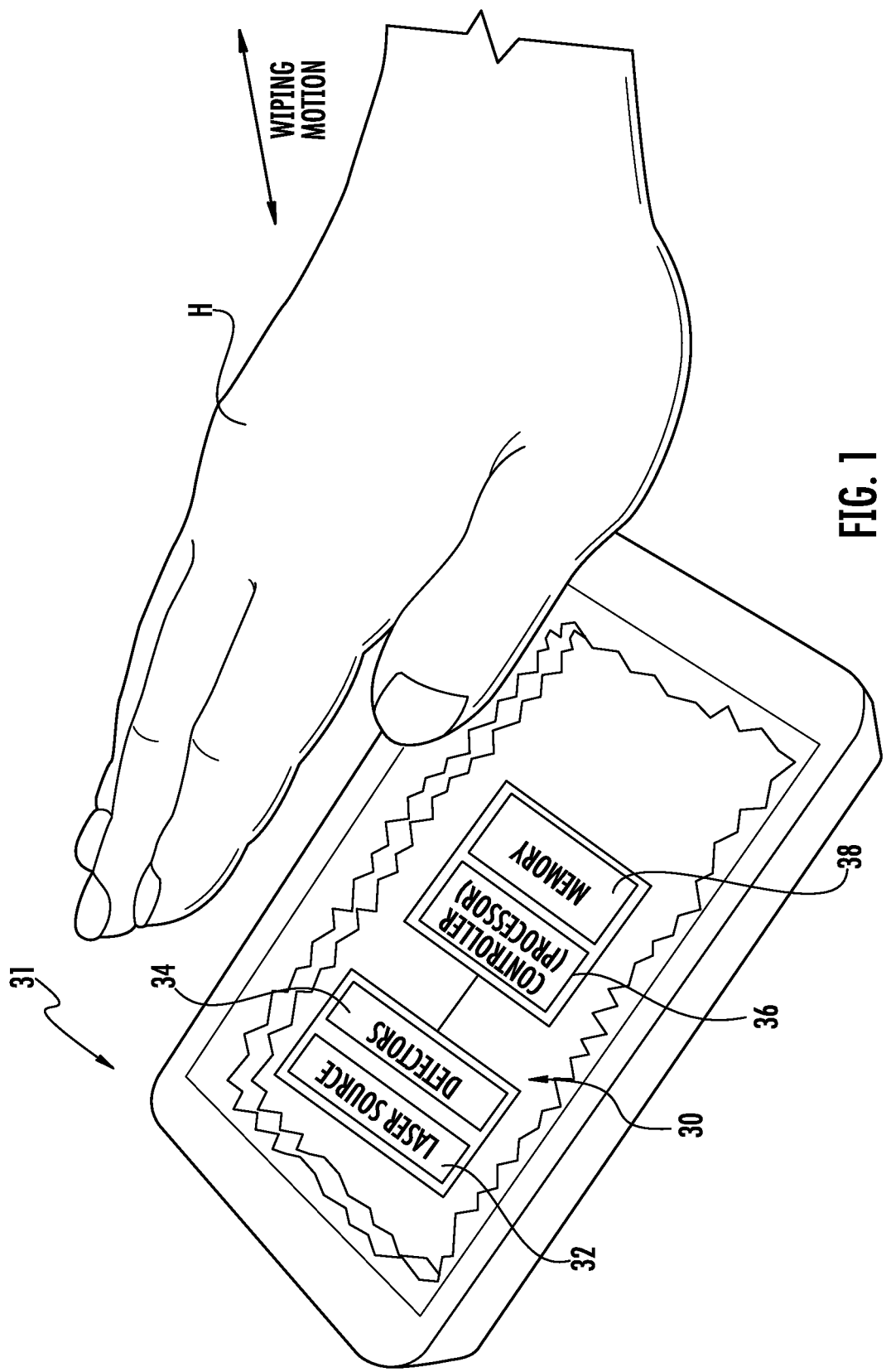
FIG. 1 is a fragmentary, partial perspective view of the electronic device for determining hand gestures in accordance with a non-limiting example.

Referring now to FIG. 1, there is illustrated the electronic device 30 as a sensing device, in accordance with a non-limiting example, such as part of a mobile wireless communications device 31, for example, a cell phone, tablet, or similar device. A fragmentary view of the interior of the mobile wireless communications device 31 is illustrated to show in block format basic components of the device 30 used for determining hand gestures, in accordance with a non-limiting example. A laser source 32 is configured to direct laser radiation towards a user's hand (H) as illustrated. At least one laser detector 34 in this example is configured to receive the reflected laser radiation from the user's hand (H). A controller 36 interoperates with a memory 38 and is coupled to the laser source 32 and laser detector 34 and configured to determine a plurality of sets of distance values to the user's hand based upon a time-of-flight of the laser radiation. The controller 36, in one example, calculates a Mean Absolute Deviation (MAD) value during a certain duration, based upon the plurality of distance values and identifies whether the user's hand is moving in a first or second gesture based upon the MAD value. In many devices, such as a mobile wireless communications device 31, the controller 36 is a microprocessor or a microcontroller with multiple functions or could be separate and function as a specific sensor processor. The first or second gesture may include a tap or wipe, and in the illustrated example, FIG. 1 shows the user sliding their hand (H) as a wipe.

Figure 2:
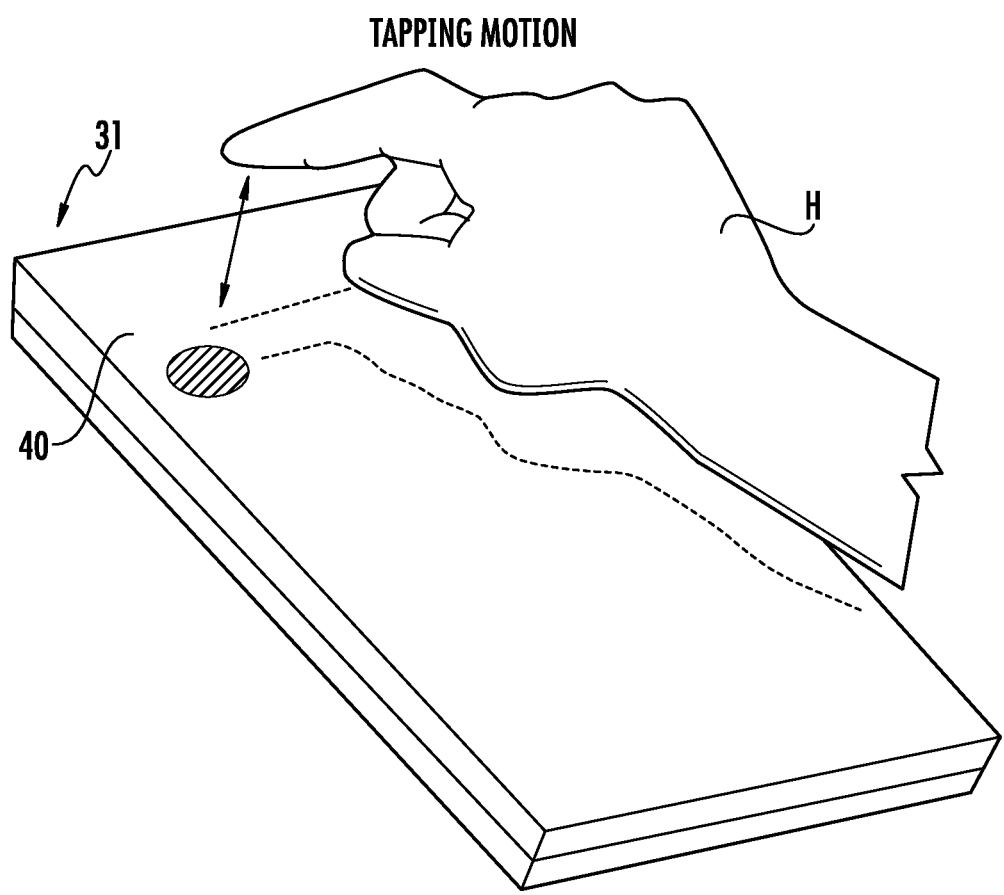
FIG. 2 is another perspective view of the electronic device as shown in FIG. 1 in accordance with a non-limiting example.

FIG. 2 shows the user's hand in a tap motion, and in this example, moving her index finger as a tap towards or onto the display screen 40 of the mobile wireless communications device 31. A calculated MAD value above a threshold indicates a tap, and a calculated MAD value under the threshold indicates a wipe. For example, the threshold may be based upon the MAD value for distance values that are closer to each other, such as during a wipe, as compared to the distance values that are changing rapidly during a tap when the finger or hand moves from top to bottom and then back to top. With a wipe, on the other hand, the distance values are more constant and closer to a constant height above the screen 40 as the user moves their finger or hand laterally across the screen in that "wiping" motion. As will be readily understood by those skilled in the art, the term "hand gesture" will be used herein for simplicity to indicate movement of the user's entire hand, or just a portion thereof, such as a finger.

It is possible to use a plurality of laser detectors 34 to determine a greater range of hand gestures. More than one laser source 32 may also be used. On a basic level with a plurality of laser detectors 34, the controller 36 is configured to calculate a MAD value for each of the plurality of distance values during a certain duration for each laser detector 34 and calculate an average MAD value to identify whether the user's hand is moving in the first or second gesture such as a wipe or tap. If a plurality of laser detectors 34 receives reflected laser radiation from the user's hand, the controller 36 determines the set of distance values to the user's hand for each respective laser detector 34. Based upon the time-of-flight of the laser radiation for each detector 34, it is possible to determine a hand gesture from among a plurality of possible hand gestures based upon the sets of distance values using Bayesian probabilities. The controller 36 may derive Bayesian probabilities, including a confusion matrix, for each of the laser detectors and weight the set of distance values using the Bayesian probabilities to determine a hand gesture as explained in greater detail below. The memory 38 may store the distance values for further processing, comparison and probability calculations. A greater variation of hand gestures may be determined, such as at least one of a single tap, a double tap, a page flip, a single wipe, a double wipe, and a rotation. A single laser source 32 and single laser detector 34 may be used to distinguish between a tap and a wipe. Distinguishing between more complex hand gestures will normally require the electronic device 30 to include at least a plurality of laser detectors 34 for Bayesian probabilities calculations.

A non-limiting example of different gestures that can be determined using the electronic device 30 are shown in FIGS. 3A and 3B. Fourteen (14) different hand gestures numbering from "00" to "13" are illustrated with their hand gesture names and a brief description of each hand gesture. The acronym LtR refers to left to right and RtL refers to right to left. LtRtL refers to left to right and then back to left, such as a double wipe with the user's hand in a natural flat position. RtLtR refers to right to left then back to right, such as the user's hand in a natural flat position. Other hand gesture movements could be from bottom to top (BtT) in a front to rear motion, or top to bottom (TtB), bottom to top then back to bottom (BtTtB), or top to bottom then back to top (TtBtT). A hand gesture can also be the hand's rotation clockwise or counterclockwise as shown in gesture nos. 12 and 13. The page flip gesture is a hand rotation either clockwise or counterclockwise. When detected by the controller 36, it will turn the virtual page on the display screen 40 in a book reading application, for example.

The controller 36 may determine other single-touch and multi-touch gestures, including a pan, flick, touch and hold, and pinch and stretch as non-limiting examples. Pinch and stretch may occur when two fingers are pointed down within the bounded area of the display screen 40 followed by the fingers moving closer together as a pinch or further apart as a stretch to reduce or enlarge a specific area displayed on the screen 40.

Figure 4:
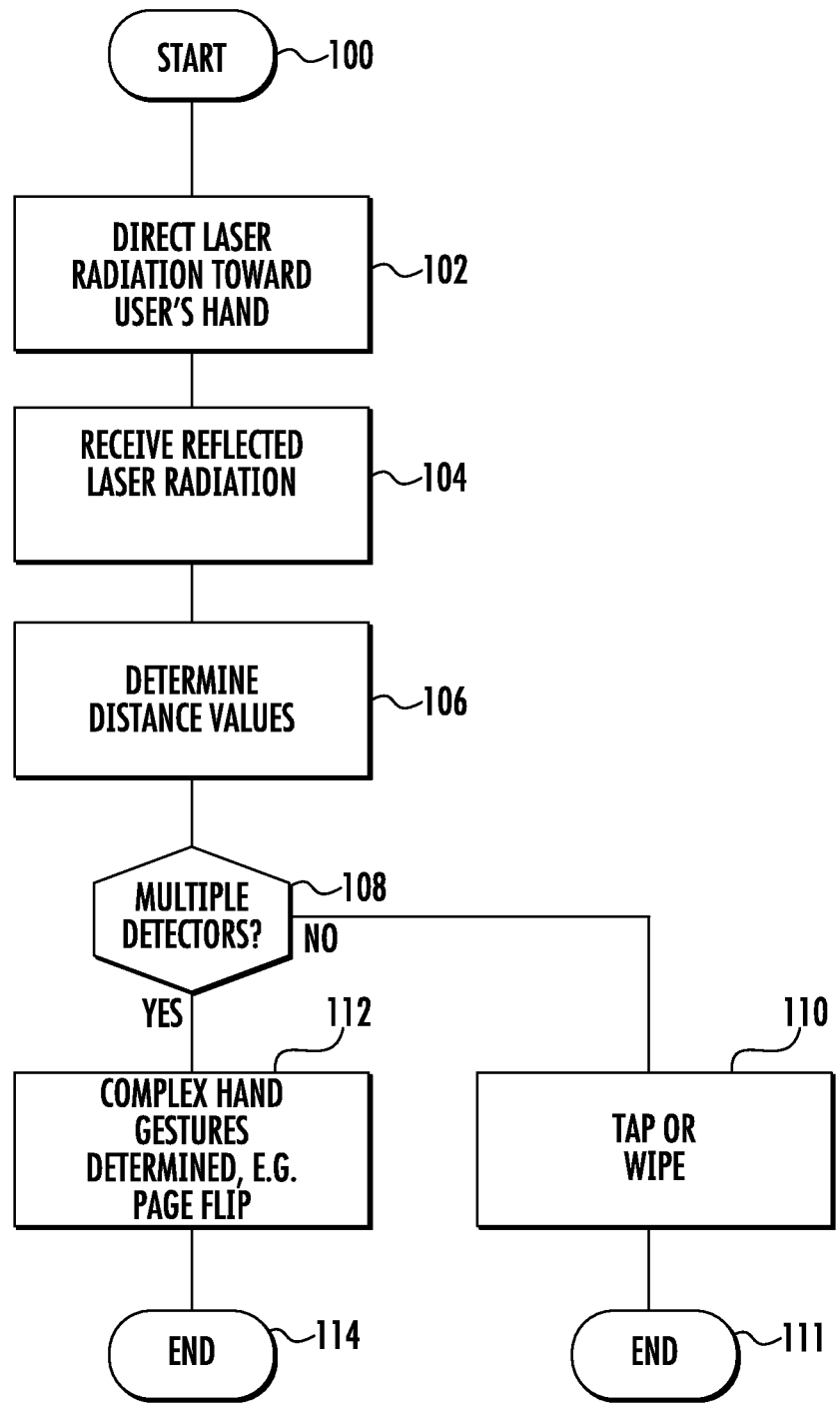
FIG. 4 is a high-level flowchart showing a process for operating the electronic device in accordance with a non-limiting example.

A flowchart showing a high-level sequence of steps for operation of the electronic device, in accordance with a non-limiting example, is shown in FIG. 4. As illustrated, the process start at Block 100. Laser radiation is directed toward a user's hand (Block 102). At least one laser detector receives the reflected laser radiation (Block 104). The controller determines distance values (Block 106). The controller also determines if multiple detectors are used (Block 108), and if not and only a single detector is used, then the controller determines whether there is a tap or wipe as a simple hand gesture (Block 110). The process ends at Block 111. If multiple detectors are used, then a tap or wipe can be determined, but also more complex hand gestures may be determined, such as a page flip (Block 112). The process ends (Block 114).

Figure 5:
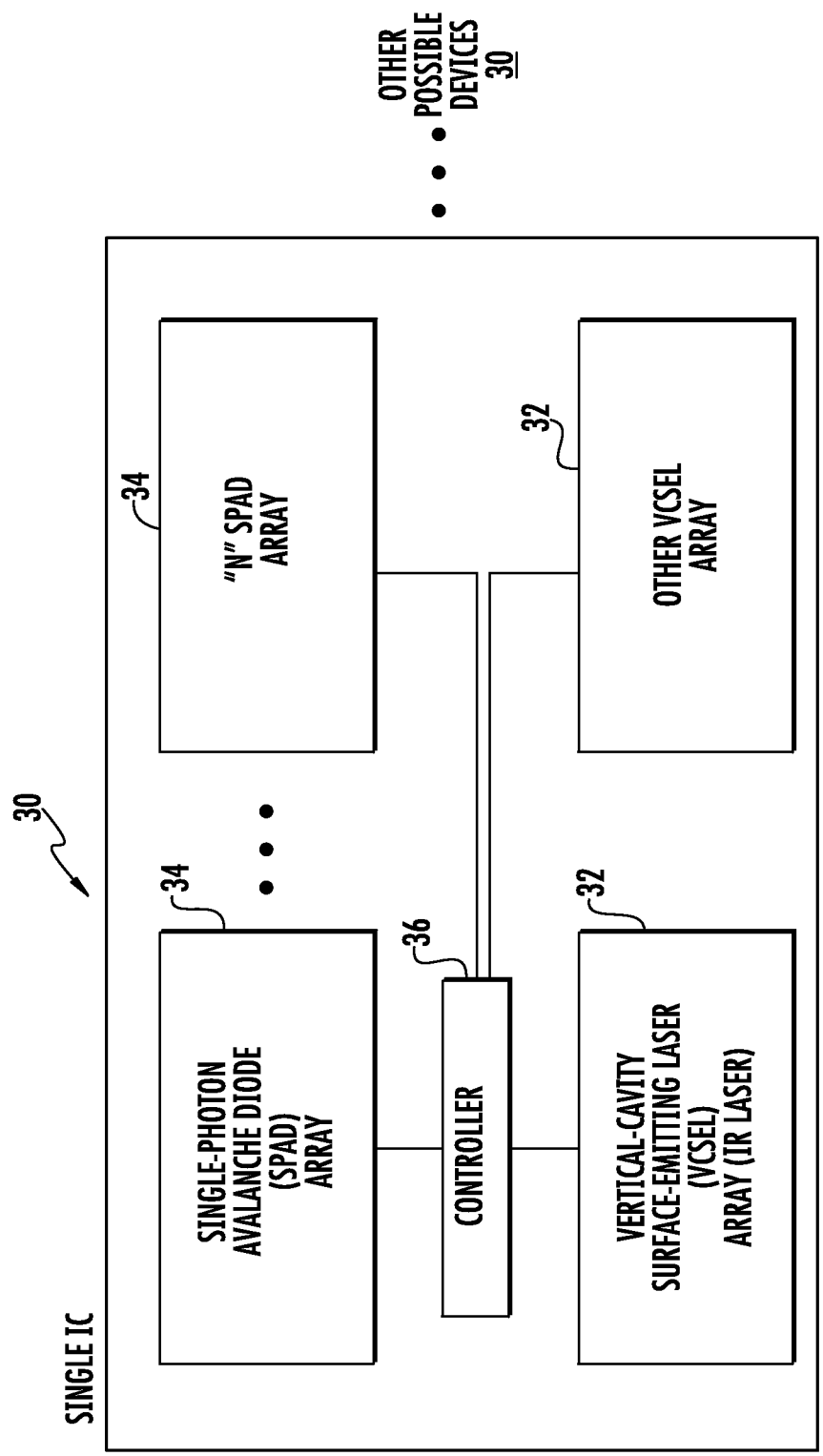
FIG. 5 is a block diagram of basic components of the electronic device in accordance with a non-limiting example.

As shown in a fragmentary and high-level block diagram of FIG. 5, the electronic device 30 is formed as a sensing device and the laser source 32, laser detector 34 and controller 36 are a single integrated circuit (IC) in this example. The laser source 32 in this example is an infrared (IR) laser source configured to direct laser radiation towards the user's hand. The laser detector 34 is configured to receive the reflected laser radiation from the user's hand, and in this example, is formed as a Single Photon Avalanche Diode (SPAD) detector 34 that receives the reflected laser radiation. In an example, the detector 34 is an array of single photon avalanche diodes. The laser source 32 may be formed as a Vertical Cavity Surface-Emitting Laser (VCSEL). Multiple laser sources 32 and laser detectors 34 may also be used and incorporated with one IC with multiple or "n" arrays of SPAD detectors or as separate, multiple devices 30. It is possible that only one laser source 32 may be used and a plurality of laser detectors 34 spaced from each other and connected to the controller 36 or a plurality of laser sources 32 as shown in FIG. 5.

As noted before, when a plurality of laser detectors 34 are used, it is possible to determine a hand gesture from among a plurality of possible hand gestures as shown in FIGS. 3A and 3B based upon the sets of distance values using the Bayesian probabilities and including a confusion matrix for each of the laser detectors as will be explained in greater detail below.

Figure 6:
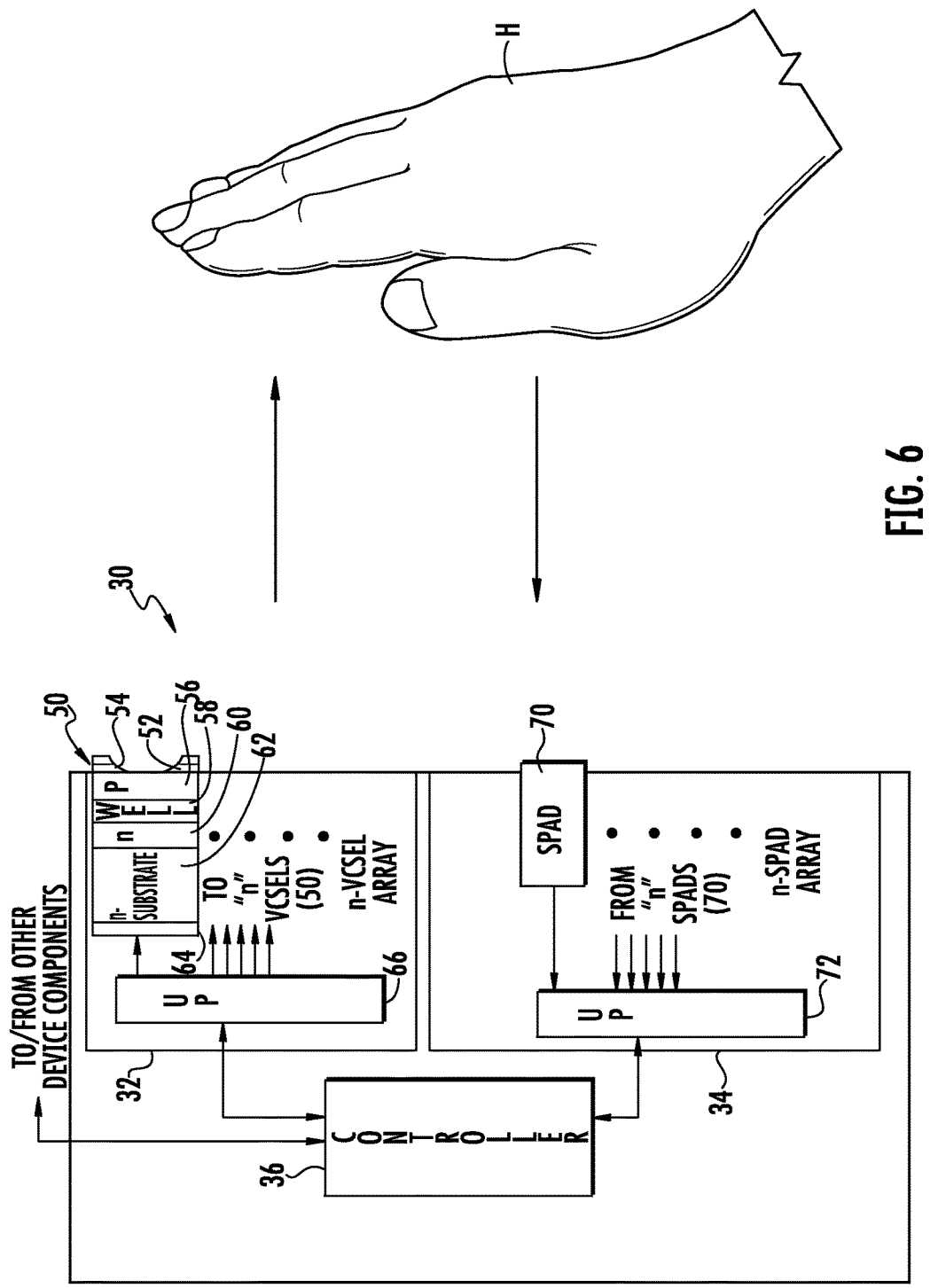
FIG. 6 is a more detailed block diagram of the electronic device as shown in FIG. 5 in accordance with a non-limiting example.

FIG. 6 is a more detailed block diagram of the electronic device 30 as a sensing device and showing details of the IR laser source 32 formed as an array of vertical-cavity surface-emitting laser (VCSEL) elements 50. Each VCSEL element 50 is formed as a semiconductor laser diode that emits light as laser radiation perpendicular to the surface and includes active layers with the thickness of a few nanometers (nm). The VCSEL elements 50 can be formed from different semiconductor processing techniques and include different active layers.

Most VCSEL elements share a general configuration. Electrical carriers are converted into light above and below an active layer. There may be multiple layers of alternating refractive index resonant mirrors having high reflectivity to achieve gain. The resonant mirrors are formed in one example as doped semiconductor mirrors that provide electrical contacts to active layers that may be defined by the width of an oxidized layer near an active layer. They may be formed in a single epitaxial growth process where semiconductor wafer processing steps define the emission area and provide electrical terminals to individual laser-diodes forming the VCSEL element 50. Each VCSEL element 50 is a vertical structure and a large number of VCSEL elements as laser diodes may be placed next to each other as a two-dimensional array and connected individually or in parallel.

The VCSEL array may be formed from thousands of the smaller VCSEL elements 50 and manufactured on GaAs wafers where the pitch between individual elements is about 40 um in a non-limiting example. In the example used with reference to the electronic device of FIG. 1, different laser wavelengths may be used. In an example, the laser source 32 has an operating wavelength in the range of 800-900 nanometers for IR use, but can extend up to 1,300 nm or higher depending on applications. Depending on other applications, lower wavelengths may be used.

A single and simplified example of a VCSEL element 50 is illustrated and includes a metal contact 52 with an opening 54 through which the laser radiation is emitted. The VCSEL element 50 includes an upper Bragg reflector 56 formed of P-type material, a quantum well 58 and a lower Bragg reflector 60 formed of an N-type material. An N-substrate 62 and metal contact 64 are included. The upper and lower Bragg reflectors (DBR) 56, 60 form mirrors and are parallel to a wafer surface and have one or more quantum wells for laser light generation. Usually the Bragg reflector mirrors include alternating high and low refractive indices and a thickness of about a quarter of the laser wavelength in a non-limiting example to yield a high reflectivity. These mirrors balance the short axial length of the gain region. The upper and lower Bragg reflector mirrors may be formed of P-type and N-type material to form a diode junction, but other N-type and P-type regions may be embedded between mirrors in non-limiting examples. The GaAs substrate allows multiple epitaxial layers to be grown. A microprocessor 66 is connected to each VCSEL element 50 to provide current control and any type of laser aiming and coordination among the VSCEL elements 50.

FIG. 6 further illustrates an array of single photon avalanche diodes (SPAD's) that form an "n" SPAD array with each diode forming a laser detector element 70 connected in this example to a microprocessor 72. Each SPAD laser detector element 70 is a solid-state photo detector in which a photo-generated carrier can trigger an avalanche current to detect low intensity signals such as a single photon. The microprocessor 72 processes the signal arrival times of photons with a jitter of a few tens of picoseconds. Usually a SPAD laser detector element 70 includes a reverse bias P-N junction to detect the laser radiation such as infrared radiation, for example, and operates with reverse-bias voltage above the breakdown voltages in a "Geiger mode" similar to a conventional Geiger counter. Different SPAD laser detection elements 70 may be used as known to those skilled in the art depending on the environmental to which the electronic device is employed to determine hand gestures. Various quenching circuits may be used, including passive and active quenching. Examples are disclosed in U.S. Pat. No. 8,610,043 to Baxter and U.S. Patent Publication No. 2014/0124652, the disclosures which are hereby incorporated by reference in their entirety.

The controller 36 operates with the microprocessors 66, 72 and various VCSEL elements 50 and SPAD laser detector elements 70 to determine a set of distance values to a user's hand for each respective laser detector as a SPAD laser detector element using time-of-flight of the laser radiation. In an example as noted before, the controller 36 determines a hand gesture by calculating a Mean Absolute Deviation (MAD) value based upon the plurality of distance values and determines whether the user's hand is moving in a first or second gesture based upon the MAD value such as a tap or wipe. Also, with a plurality of detectors as described before, a more complex hand gesture may be determined from among a plurality of possible hand gestures based upon the sets of distance values using Bayesian probabilities.

Because time-of-flight measurements are processed, the device 30 as a sensing device is more precise than other gesture detection systems and may detect gestures up to about 50 cm away from a mobile wireless communications device or other device incorporating the sensing device 30, such as a tablet, notebook computer, consumer electronic devices or other device containing the laser source 32 and laser detector 34. Usually, the mobile wireless communications device, tablet or other device may include small apertures to emit the laser radiation and permit its return to the laser detector. Because the laser radiation is narrow, the apertures can be very small and concealed, such as behind a speaker grill.

In one example of the electronic device 30, the controller 36 calculates a Mean Absolute Deviation (MAD) value based on the plurality of distance values, measured during a certain duration. The Mean Absolute Deviation may be around the "mean" and is referred also as the mean deviation or the average absolute deviation. This value is used instead of standard deviation as a more simple measure of variability than standard deviation.

It is also possible to use Bayesian probabilities to determine a hand gesture from among a plurality of possible hand gestures based upon the sets of distance values when a plurality of detectors are used. In a Bayesian probability calculation, prior probabilities such as stored in memory 38 and the processed data are updated in light of new relevant data or evidence, for example, changing distance values as measured by the different laser detectors 34. Usually random variables as unknown quantities are used to model sources of uncertainty in statistical models. A prior probability distribution takes into account the available prior data and information regarding distance calculations and probable hand gesture determinations. For example, different distance values may be weighted when used to determine the confusion matrix for each of the laser detectors. Previous values may be stored in memory 38 and then compared. When data becomes available, a posterior distributions may be calculated using Bayes' formula. In an example device 30, the controller 36 is configured to derive the Bayesian probabilities as a confusion matrix for each of the laser detectors. In this example, a confusion matrix contains information about actual and predicted classifications such as the different hand gestures. Different hand gestures may be classified using data in a matrix that is stored in the memory 38. For example, a wipe movement could be one classification and a hand flip another classification, and comparisons can be made as a portion of the total number of predictions that were correct. A true positive rate is the proportion of positive cases that were correctly identified. A false positive rate is the proportion of negative cases that were incorrectly classified as positive. A true negative rate is the proportion of negative cases that were classified correctly. A false negative rate is the proportion of positive cases that were incorrectly classified. The precision may be based on the proportion of predicted positive cases that were correct.

There now follows a description of how the controller 36 determines a plurality of distance values to the user's hand using a single laser detector or a plurality of laser detectors 34. Based upon time-of-flight of the laser radiation, the controller 36 determines a hand gesture from among a plurality of possible hand gestures based upon the sets of distance values using the Bayesian probabilities, or calculates a MAD value and identifies whether the user's hand is moving in a first or second gesture such as a tap or wipe based upon the MAD value. For a simplified single tap and single wipe detection, for example, including use of only one laser detector, distance values may be changing during a tap such as moving the hand or finger from top to bottom and then to top, while distance values are more constant during a wipe, such as wiping the finger or hand across the surface of the mobile wireless communications device 31 or other device at a more constant distance from the display area 40 of the device.

Figures 7, 8:
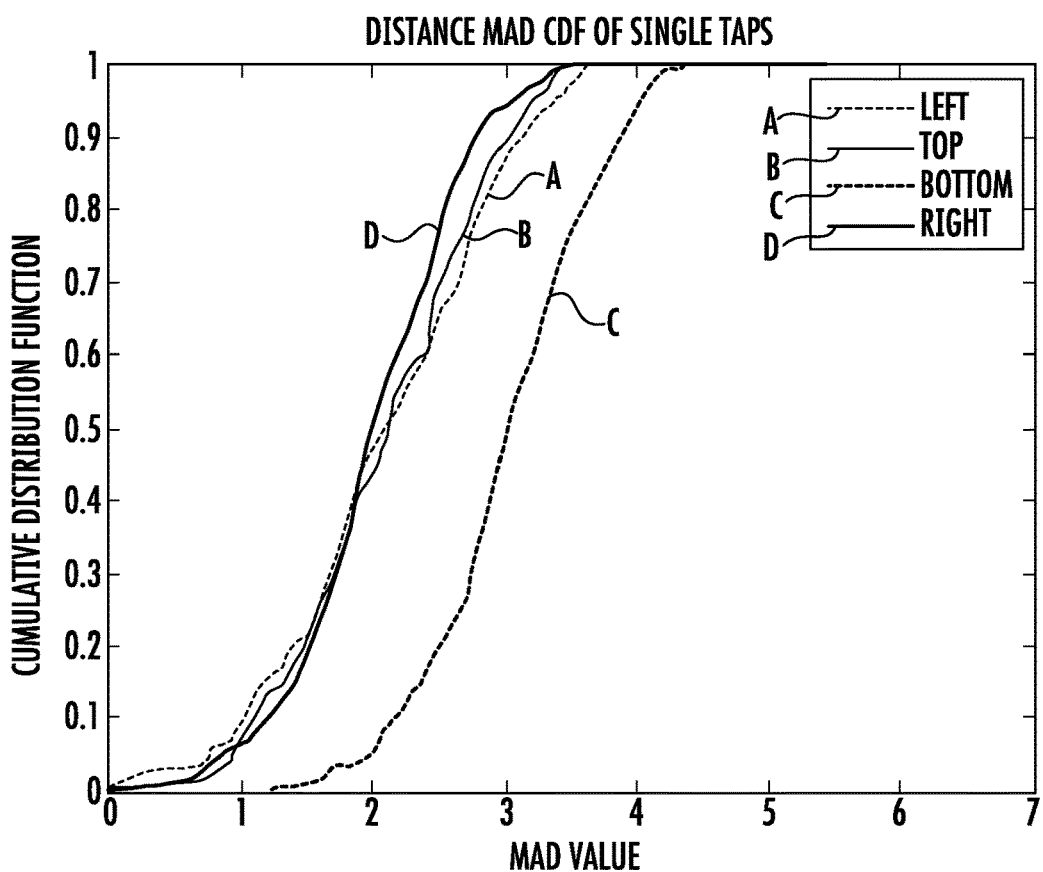
FIG. 7 is an example of MAD values for wipe and tap hand gestures in accordance with a non-limiting example.
FIG. 8 is a graph showing cumulative distribution function versus MAD values for a single tap in accordance with a non-limiting example.
Figure 9:
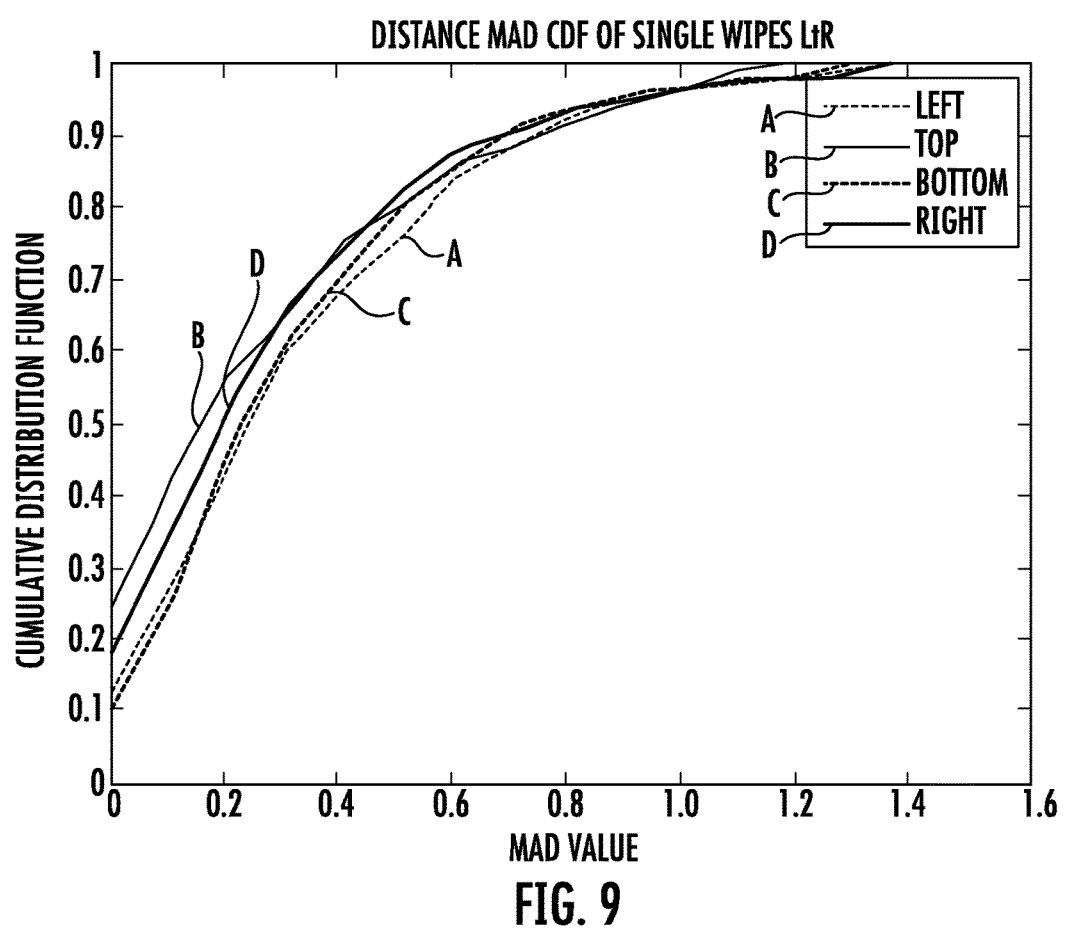
FIG. 9 is a graph similar to FIG. 8, but showing values for a single wipe as left to right in accordance with a non-limiting example.
Figure 10:
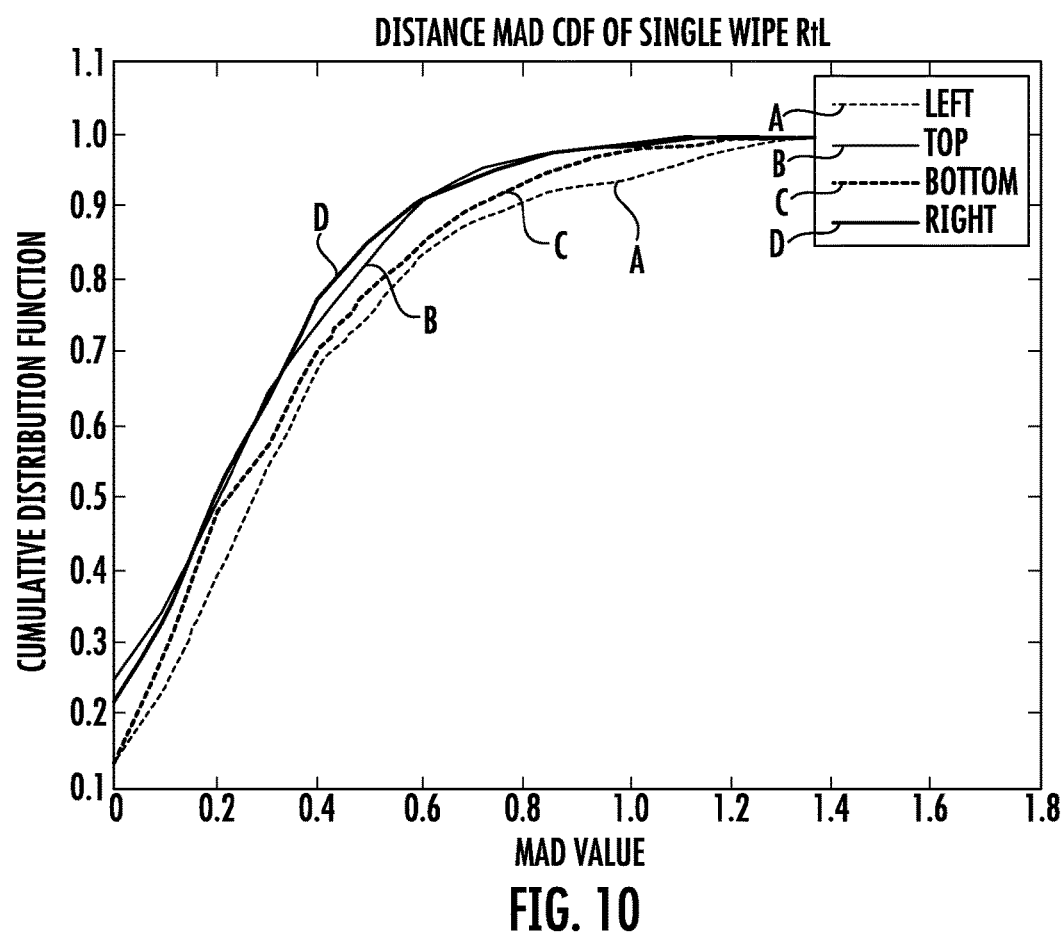
FIG. 10 is a graph similar to FIG. 8, but showing values for a single wipe as right to left in accordance with a non-limiting example.
Figure 11:
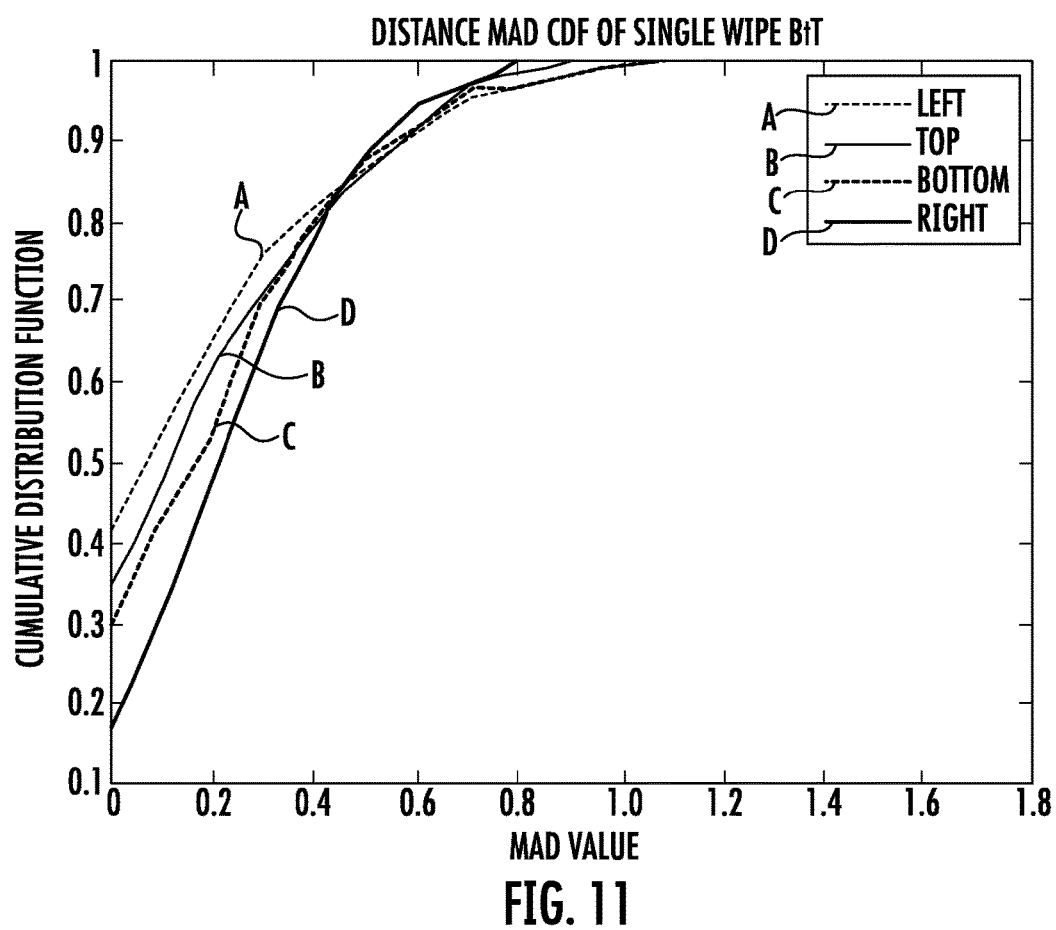
FIG. 11 is a graph similar to FIG. 8, but showing values for a single wipe as bottom to top in accordance with a non-limiting example.
Figure 12:
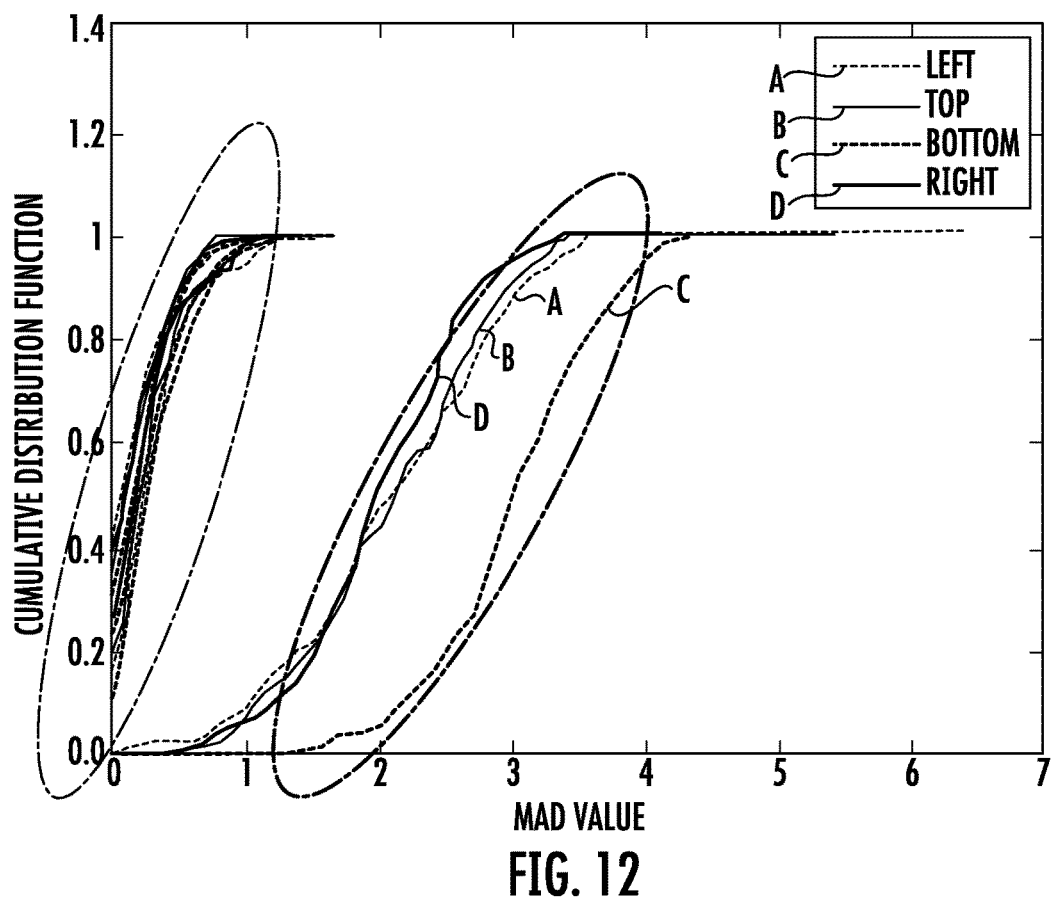
FIG. 12 is a graph showing the combined cumulative distribution function versus the MAD values for the single tap and the single wipes from FIGS. 8-11 in accordance with a non-limiting example.
Figure 13:
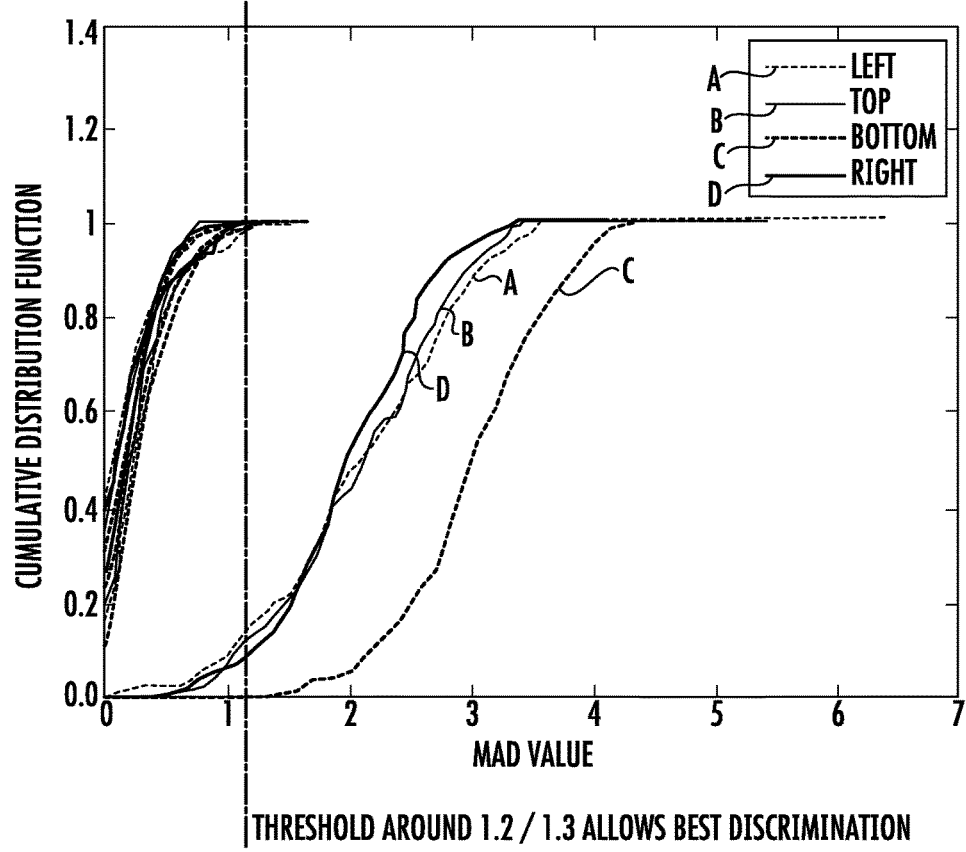
FIG. 13 is a graph showing the calculated threshold line based upon the previous graphs of FIGS. 8-12 in accordance with a non-limiting example.

The table in FIG. 7 are examples of MAD values for five different hand gestures as illustrated as the four types of wipe as left to right (LtR), right to left (RtL), bottom to top (BtT), and top to bottom (TtB), and a single tap. In this example, four laser detectors 34 are used. The MAD values for each detector are listed in this example, and each corresponds to the left, top, bottom, and right laser detectors 34 when oriented in a diamond or square configuration. It should be understood that one detector 34 may be used, however, if only a wipe or tap is to be determined. An example measurement determination of a threshold of around 1.2 to 1.3 to allow the best discrimination is shown in the examples of FIGS. 8-12, showing cumulative distribution function versus the MAD value for a single tap (FIG. 8), a single wipe as a left to right (FIG. 9), a single wipe as right to left (FIG. 10), a single wipe as bottom to top (FIG. 11), and a single tap versus a single wipe (FIG. 12). In FIG. 12, the left circle shows the single wipe and the right circle shows the single tap. The threshold determination of 1.2/1.3 is shown in FIG. 13. This threshold may also be precalculated or adaptive and based on the multiple sensing through learning.

In an example using multiple laser detectors 34, the mean of distance values (over a non-idle period) per detector is calculated and the MAD value is calculated. The number of detectors for which the MAD value is lower (resp. higher) is counted as compared to the threshold T=1.2.

$$NbGTT = \sum_{sensor=1}^{4} (MAD \geq T) \quad NbLTT = \sum_{sensor=1}^{4} (MAD \leq T)$$

It is a single tap if: NbGTT≥NbLTT. Other possibilities are that all laser detectors 34 are triggered for a start and end of gesture or at the same or close to the same instants for a tap. Another possibility is the detectors 34 are triggered at different instants for a wipe.

It is also possible to use triggered time differences among the multiple detectors 34. For example, detectors 34 may be triggered by the start and end of a gesture or at the same or close to the same instants for a tap, or triggered at different instants for a wipe. In this example, each detector 34 determines:

a) First non-idle instant: "Start Instant" SI;
b) Last non-idle instant: "End Time" EI; and
c) Arithmetic mean of "Start" and "End" Instants: "Middle Instant" MI.

The controller 36 may compute horizontal and vertical difference instants:

a) ΔH_Start=SI (Right Sensor)−SI (Left Sensor);
b) ΔH_End=EI (Right Sensor)−EI (Left Sensor);
c) ΔH_Middle=MI (Right Sensor)−MI (Left Sensor);

d) ΔV_Start=SI (Top Sensor)−SI (Bottom Sensor);
e) ΔV_End=EI (Top Sensor)−EI (Bottom Sensor); and
f) ΔV_Middle=MI (Top Sensor)−MI (Bottom Sensor).

An example of a statistical discrimination is shown in the table of FIG. 14. The average value is in milliseconds and the middle difference instants are more reliable by the averaging of the jitter effect. The absolute values can help discriminate meaningful information from time jitter. For example, below 25 ms can be considered as a null or negligible movement, and above 35 ms can be considered as an intentional movement.

A single tap may be detected as both negligible horizontal and vertical difference instants. Single wipes may be detected as having a meaningful maximum difference instant (either H or V).

It is possible to combine the MAD and difference instant systems as follows:

1) Compute mean and MAD of distance values (over non-idle period) per sensor;
2) Count the number of detectors as sensors for which the MAD value is lower (resp. higher) than the threshold T=1.3

$$NbGTT = \sum_{sensor=1}^{4} (MAD \geq T) \quad NbLTT = \sum_{sensor=1}^{4} (MAD \leq T)$$

3) Compute ΔH_Middle and ΔV_Middle;
4) Compute scores for single tap and single wipes as follows:

$$SingleTapScore = NbGTT + \sum_{Direction=(H,V)} (|\Delta_{Middle}| \leq 15)$$

$$SingleWipeScore = NbLTT + 2 * \left( \max_{Direction=(H,V)} |\Delta_{Middle}| \geq 35 \right),$$

and
5) Compare both scores (or derive a soft output).

An example maximum score is shown in the table in FIG. 15 for a single tap and single wipe with different examples of wipes as Left to Right (LtR), Right to Left (RtL), Back to Top (BtT), and Top to Bottom (TtB).

Figure 16:
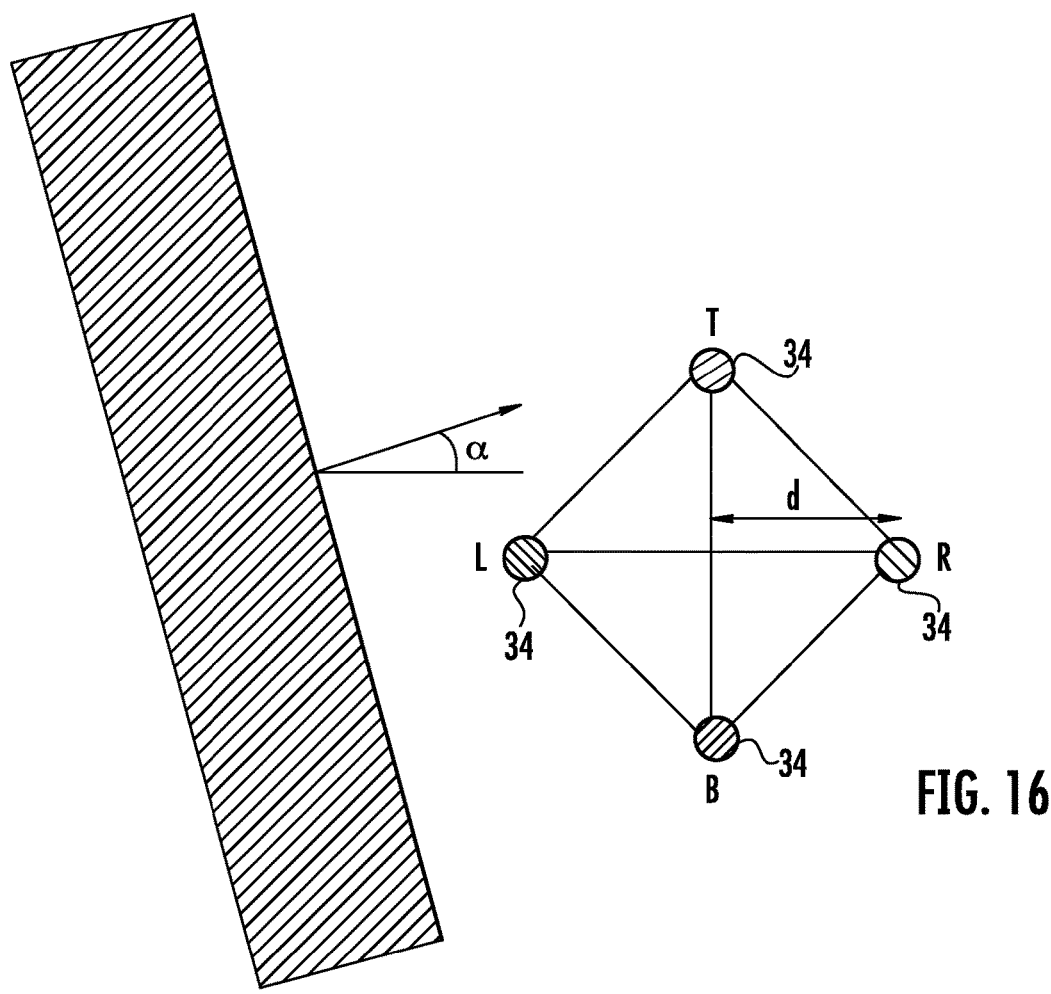
FIG. 16 is an example of a laser detector positional diagram and analytical analysis of a single wipe movement in accordance with a non-limiting example.
Figure 17:
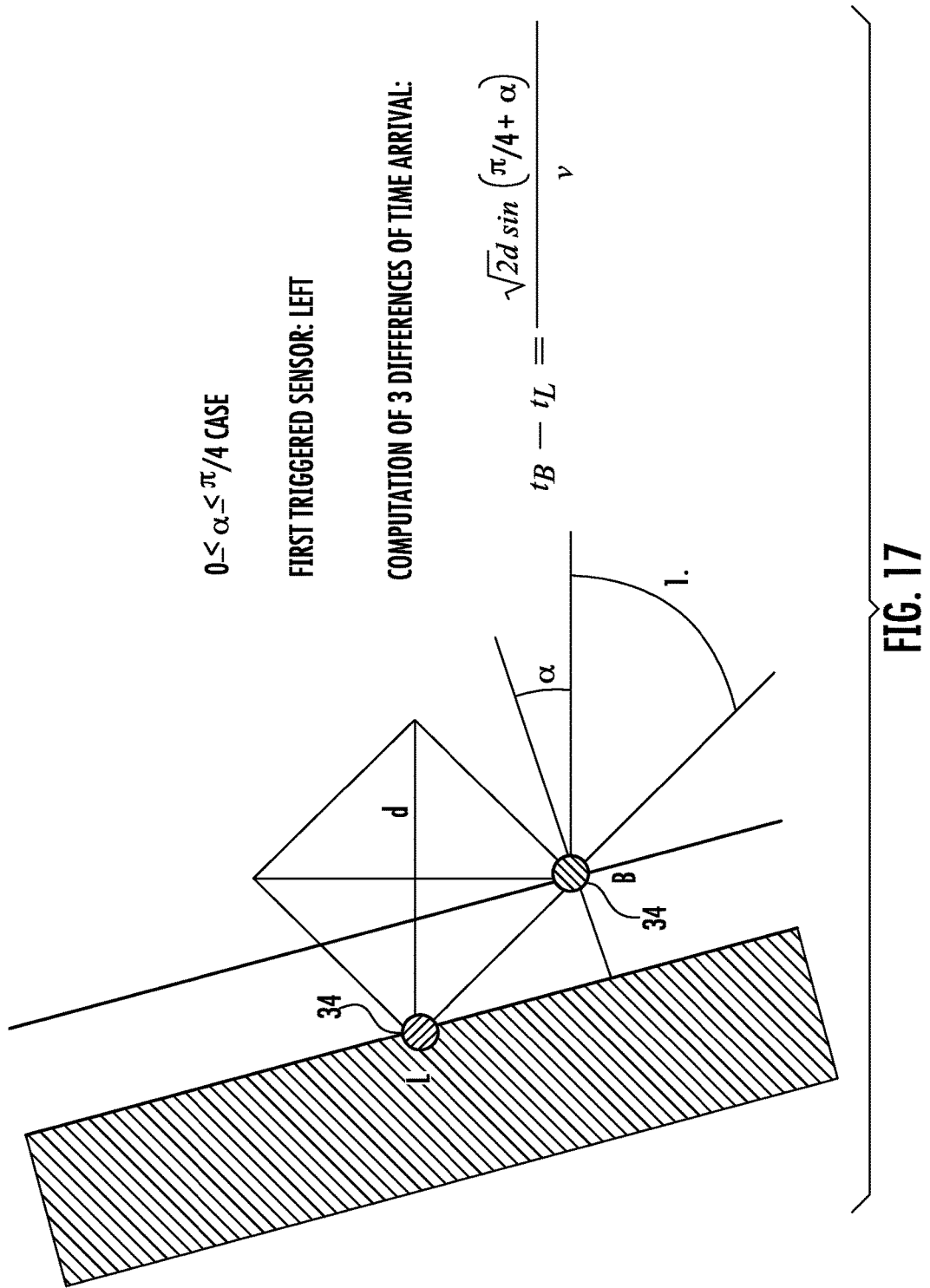
FIGS. 17-19 are graphs and computations for angular decision criterion examples for a first triggered sensor in accordance with non-limiting examples.
Figure 18:
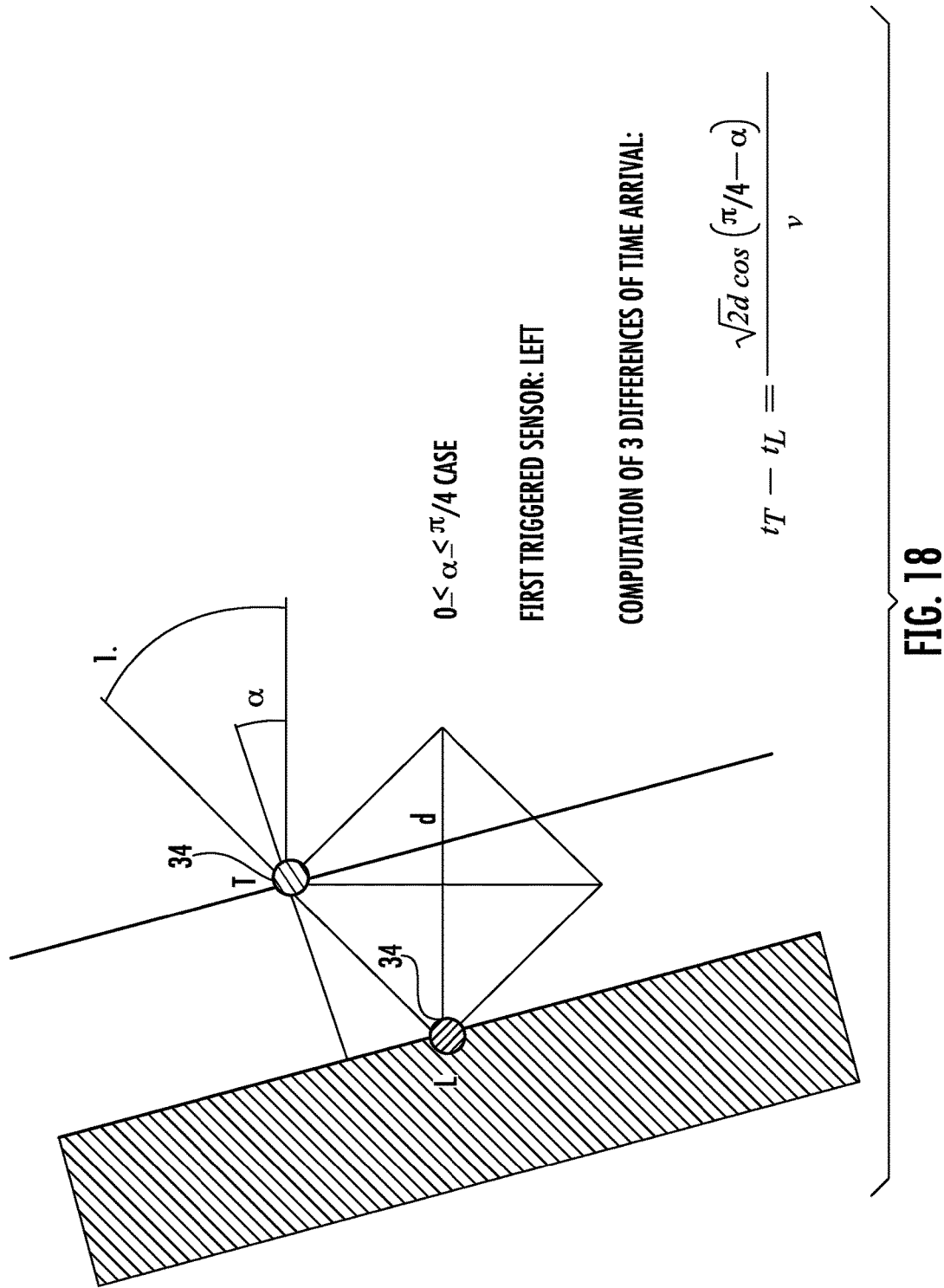
Figure 19:
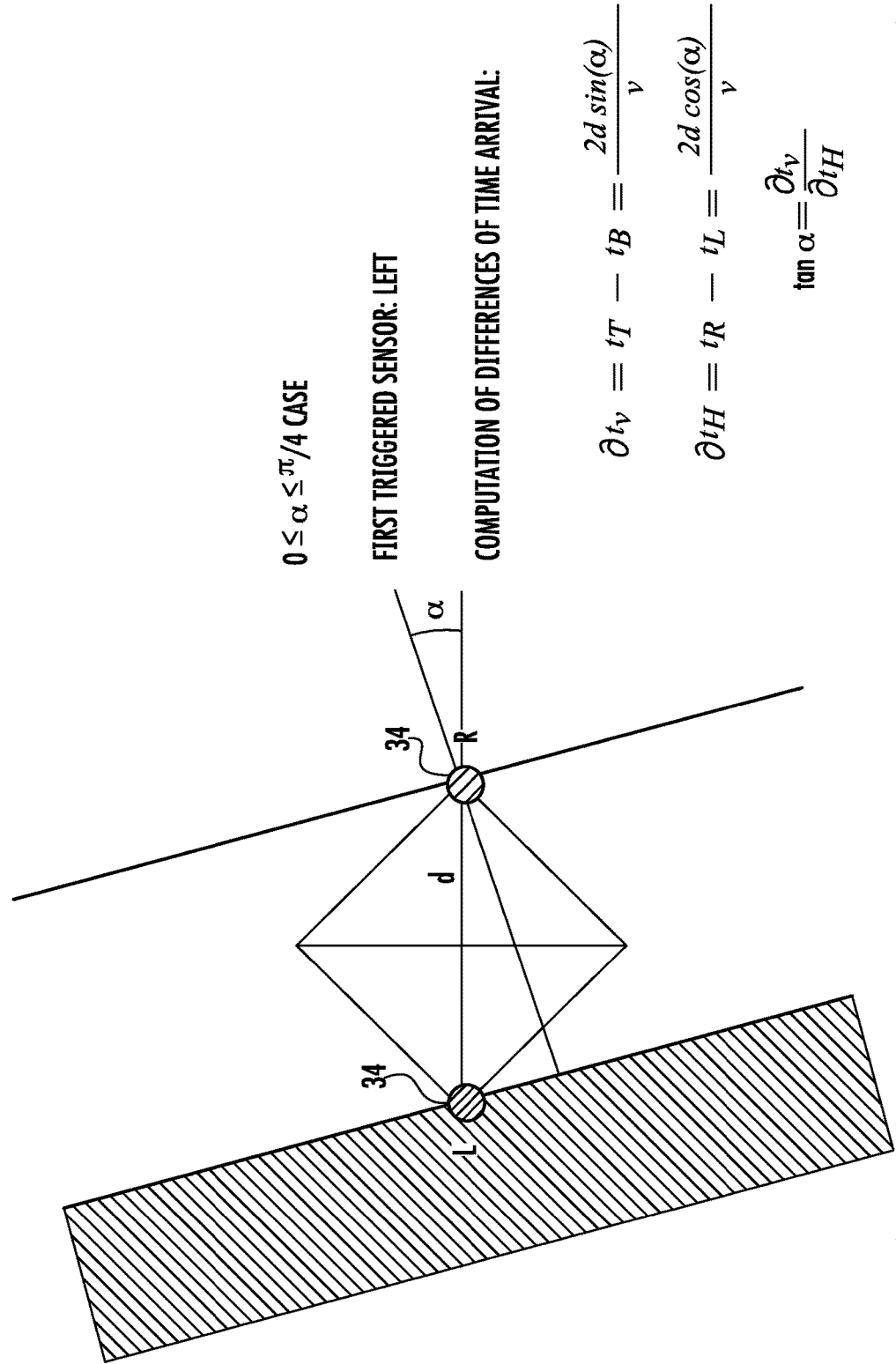

FIG. 16 is an example of a laser detector positional diagram showing the left, right, top and bottom laser detector 34 positions and an analytical analysis of a single wipe movement. In this example, the hand (H) is modeled as an infinite linear edge moving at a constant height and constant speed V. The a (alpha) normal angle is with respect to the X-axis. The laser detector or sensor layout is modeled as a square with a half-diagonal "d" as illustrated, which depends on the upper hand's height of the upper hand. The measurements are taking into account the time-of-arrival of first non-null measures per detector 34. An intuitive decision may be made as to which is the first triggered detector 34 based on a first time-of-arrival signal as a start instant. It is possible to use a stop instant or a middle instant. It is also possible to use a last triggered detector based on a last time-of-arrival as a start instant, stop instant, or middle instant. Angular decision criterion examples are shown in FIGS. 17, 18 and 19. Each has a first triggered left sensor 34 and shows computation of the differences of time.

With these examples, it is possible to proceed with controller 36 calculations as follows with the 0≤α≤π/4 application. The first triggered sensor is the left sensor. The controller 36 calculates:

$$\partial t_V = t_T - t_B = \frac{2d \sin(\alpha)}{v} \quad \partial t_H = t_R - t_L = \frac{2d \cos(\alpha)}{v}$$

From above, the system can eliminate d and v:

$$\frac{2d}{v} = \sqrt{(\partial t_V)^2 + (\partial t_H)^2}$$

$$\begin{cases} \cos \alpha = \dfrac{\partial t_H}{\sqrt{(\partial t_V)^2 + (\partial t_H)^2}} \\ \sin \alpha = \dfrac{\partial t_V}{\sqrt{(\partial t_V)^2 + (\partial t_H)^2}} \\ \tan \alpha = \dfrac{\partial t_V}{\partial t_H} \end{cases}$$

Again for, 0≤α≤π/4 application, the first triggered sensor is the left. The last equation leads to:

$$\tan \alpha = \frac{\partial t_V}{\partial t_H}$$

=>A can be estimated from instant differences.

The following benefits occur when operating the device 30 in this manner:

a) there is no need for knowing d nor v;
b) there is an optimal detector for single wipe movements and hand angle;
c) there is no need for complex arithmetic (only one division+LUT+logic);
d) it is easily extendable to the whole quadrant cases; and
e) it is easily extendable (for robustness) to a stop instant, assuming parallel edges or not and both measures are in distance and amplitude.

It is also possible to use a simplified angular decision based on the sign of the vertical time-of-arrival difference and a horizontal time-of-arrival difference with the detection based on the sign and differences of their absolute values. A start instant, stop instant or middle instant may be used. This is an extension of a hard decision criterion that takes into account the individual time-of-arrivals on each laser detector 34 and attempts to derive a soft or non-binary measure. Once normalized, the time-of-arrival in a first detector 34 equals 0, and the time-of-arrival in the last detector equals 1. The normalized times-of-arrival usually comply with a profile and "0" for the first triggered detector and 0.5 for the second and third triggered detectors as neighbors to the first triggered detector and 1 for the last triggered detector opposite to the first detector. Each gesture may be associated with a specific temporal profile. It is possible to compute the normalized temporal instants of a received signal and compute the distances to the normalized temporal profiles for each gesture. The detected gesture is the one with the smallest distance and the start instants and middle instants may be used.

It is possible that different detectors 34 may give different recognition results, and an individual detector may be "good" in certain circumstances and "bad" in others, while it may be the opposite case for another detector. The idea is to combine the "strengths" of each laser detector 34 and use a voting principle when several detectors are running parallel on the same signal. A voting process may be organized among all possible gesture candidates with one vote per laser detector 34 and the gesture candidate which obtains the majority is selected as the probable gesture.

The controller 36 will calculate the "strengths" of individual detectors 34. The confusion matrix will give a good insight into the capability of a detector 34 to provide the correct gesture, knowing which gesture has been made.

Confusion Matrix of detector $d$: $\quad C^d(i, j) = P(\overline{G_i^d} \mid G_j)$ ($i$: column index, $j$: row index)

The controller 36 may derive a likelihood matrix, which gives the probability that a specific gesture has been made, knowing which gesture has been detected.

Likelihood Matrix of detector $d$: $L^d(i,j) = P(G_i \mid \overline{G_j^d})$

The controller may assume an equal distribution of the gestures of the test database:

$$L^d(i, j) \propto P(\overline{G_j^d} \mid G_i) P(G_i)$$

$$L^d(i, j) = \frac{C^d(j, i)}{\sum_j C^d(j, i)}$$

The controller 36 may combine the results of several individual detectors 34. Assuming that each detector d (from to D) gives independent results: $\overline{G_{j_d}^d}$
The controller obtains:

$p(G_i \mid \overline{G_{j_1}^1}, \ldots, \overline{G_{j_d}^d}, \ldots, \overline{G_{j_D}^D}) = P(G_i \mid \overline{G_{j_1}^1}) \times \ldots \times P(G_i \mid \overline{G_{j_d}^d}) \times \ldots \times P(G_i \mid \overline{G_{j_D}^D}) / P(G_i)^{D-1}$ The optimal outcome of this combination of detectors 34 is the one which maximizes the previous a posteriori probability among all possible values of i. Assuming an equally distributed gesture, it corresponds to maximize its numerator.

For each detector d and for each possible detected value:

$\overline{G_{j_d}^d}$

The vector of its corresponding likelihoods is associated:

$(P(G_1 \mid \overline{G_{j_d}^d}), \ldots, P(G_n \mid \overline{G_{j_d}^d})) = (L^d(1, j_d) \ldots L^d(n, j_d))$ i.e. the $j_d^{th}$ row of $L^d$.

The controller 36 combines the results of several individual detectors as follows:

a) By multiplying, term by term, each likelihood vector associated to individual detector results, the controller obtains a combined vector which represents:

$P(G_i \mid \overline{G_{j_1}^1}, \ldots, \overline{G_{j_d}^d}, \ldots, \overline{G_{j_D}^D}), i \in \{1, n\}$ b) The result is:

$\operatorname{argmax} P(G_i \mid \overline{G_{j_1}^1}, \ldots, \overline{G_{j_d}^d}, \ldots, \overline{G_{j_D}^D}), i \in \{1, n\}$ c) For implementation consideration, the controller may replace the term-by-term product of likelihood vectors by the term-by-term sum of log-likelihoods;

d) Compared to the naïve voting process, this optimal detector corresponds to assigning «soft» voting values (namely the likelihoods) during a voting process; and e) These likelihoods are computed offline (based on the results of individual detector on the training samples) and need to be stored (16 values per detector in this case).

The electronic device 30 as described with the laser source 32, laser detector 34 and controller 36 exhibits a success rate comparable to much more complicated machine learning based detector systems and has low computational complexity with only a few additions and fewer multiplications. There are no divisions and no trigonometric functions and a limited memory requirement is required with a simple logic. The processing is easily adapted to a microcontroller or other processors as part of a small mobile wireless communications device. It is also advantageous over other detector systems that use position detection systems and phase-based sensing.

This application is related to copending patent application entitled, "DEVICE AND METHOD FOR RECOGNIZING HAND GESTURES USING TIME-OF-FLIGHT SENSING," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:
    a laser source configured to direct laser radiation toward a user's hand;
    a plurality of laser detectors configured to receive reflected laser radiation from the user's hand; and
    a controller coupled to the laser source and the plurality of laser detectors and configured to:
        determine a plurality of distance values to the user's hand based upon a time-of-flight of the laser radiation, the distance values being determined for a duration of time when the user's hand is moving;
        calculate a mean absolute deviation (MAD) value for each of the plurality of laser detectors based upon the plurality of distance values;
        calculate an average MAD value based upon the MAD value calculated for each of the plurality of laser detectors; and
        identify whether the user's hand is moving in a first or second gesture based upon the average MAD value.

2. The electronic device according to claim 1, wherein the first and second gestures comprise a tap and a wipe, respectively.

3. The electronic device according to claim 2, wherein the average MAD value being above a threshold indicates the tap and the average MAD value being under the threshold indicates the wipe.

4. The electronic device according to claim 1, wherein each of the plurality of laser detectors is configured to receive reflected laser radiation from the user's hand.

5. The electronic device according to claim 1, further comprising a memory coupled to the controller and configured to store the plurality of distance values.

6. The electronic device according to claim 1, wherein each of the plurality of laser detectors comprises a single photon avalanche diode (SPAD) detector configured to receive reflected laser radiation.

7. The electronic device according to claim 6, wherein the SPAD detector comprises an array of single photon avalanche diodes.

8. The electronic device according to claim 6, wherein the laser source, the plurality of SPAD detectors, and controller are formed as a single integrated circuit (IC).

9. The electronic device according to claim 1, wherein the laser source comprises a vertical-cavity surface-emitting laser (VCSEL).

10. The electronic device according to claim 1, wherein the laser source comprises an infrared (IR) laser source.

11. An electronic device comprising:
a laser source configured to direct laser radiation toward a user's hand, the laser source comprising a vertical-cavity surface-emitting laser (VCSEL);
a plurality of single photon avalanche diode (SPAD) detectors, each SPAD detector configured to receive reflected laser radiation from the user's hand, each SPAD detector comprising an array of single photon avalanche diodes; and
a controller coupled to the laser source and the plurality of SPAD detectors and configured to:
determine a plurality of distance values to the user's hand based upon a time-of-flight of the laser radiation, the distance values being determined for a duration of time when the user's hand is moving,
calculate a mean absolute deviation (MAD) value for each of the plurality of SPAD detectors based upon the plurality of distance values,
calculate an average MAD value based upon the MAD value calculated for each of the plurality of SPAD detectors; and
identify whether the user's hand is moving in a first or second gesture based upon the average MAD value.

12. The electronic device according to claim 11, wherein the first and second gestures comprise a tap and wipe, respectively.

13. The electronic device according to claim 12, wherein the average MAD value being above a threshold indicates the tap and the average MAD value being under the threshold indicates the wipe.

14. The electronic device according to claim 11, wherein each SPAD detector is configured to receive reflected laser radiation from the user's hand.

15. The electronic device according to claim 11, wherein each of the first gesture and the second gesture comprise a single tap, a double tap, a page flip, a single wipe, a double wipe, or a rotation.

16. The electronic device according to claim 11, wherein the laser source, the plurality of SPAD detectors, and the controller are formed as a single integrated circuit (IC).

17. The electronic device according to claim 11, wherein the laser source comprises an infrared (IR) laser source.

18. A method of determining a hand gesture, the method comprising:
directing laser radiation toward a user's hand;
detecting reflected laser radiation from the user's hand using a plurality of laser detectors; and
determining a plurality of distance values to the user's hand based upon a time-of-flight of the laser radiation, the distance values being determined for a duration of time when the user's hand is moving;
calculating a mean absolute deviation (MAD) value for each of the plurality of laser detectors based upon the plurality of distance values;
calculating an average MAD value based upon the MAD value calculated for each of the plurality of laser detectors; and
identifying whether the user's hand is moving in a first or second gesture based upon the average MAD value.

19. The method according to claim 18, wherein the first and second gestures comprise a tap and a wipe, respectively.

20. The method according to claim 19, wherein the average MAD value being above a threshold indicates the tap and the average MAD value being under the threshold indicates the wipe.

21. The method according to claim 18, wherein:
the laser radiation is directed from a laser source;
a controller is used to identify whether the user's hand is moving in the first gesture or the second gesture; and
the laser source, the plurality of laser detectors, and the controller are formed as a single integrated circuit (IC).

22. The method according to claim 18, wherein the laser radiation is directed from a vertical-cavity surface-emitting laser (VCSEL) and wherein the reflected laser radiation is detected using a plurality of photon avalanche diode (SPAD) detectors.

23. The method according to claim 18, further comprising storing the plurality of distance values in a memory.

24. The method according to claim 23, wherein the calculating the MAD value comprises calculating the MAD value based on distance values detected at each of the plurality of laser detectors.

25. The electronic device according to claim 1, wherein the distance values are determined for a duration of time when the user's hand is moving.

* * * * *